Dec. 1, 1964                      W. ENGI                    3,159,196
PROTECTIVE DEVICE FOR CUTTING MACHINES WITH CUTTING DISC
Filed April 27, 1962                                          2 Sheets-Sheet 1
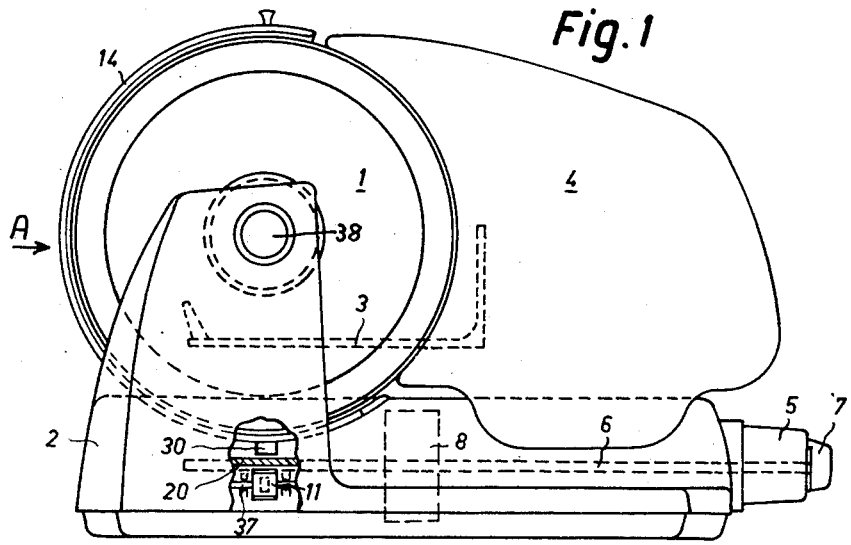
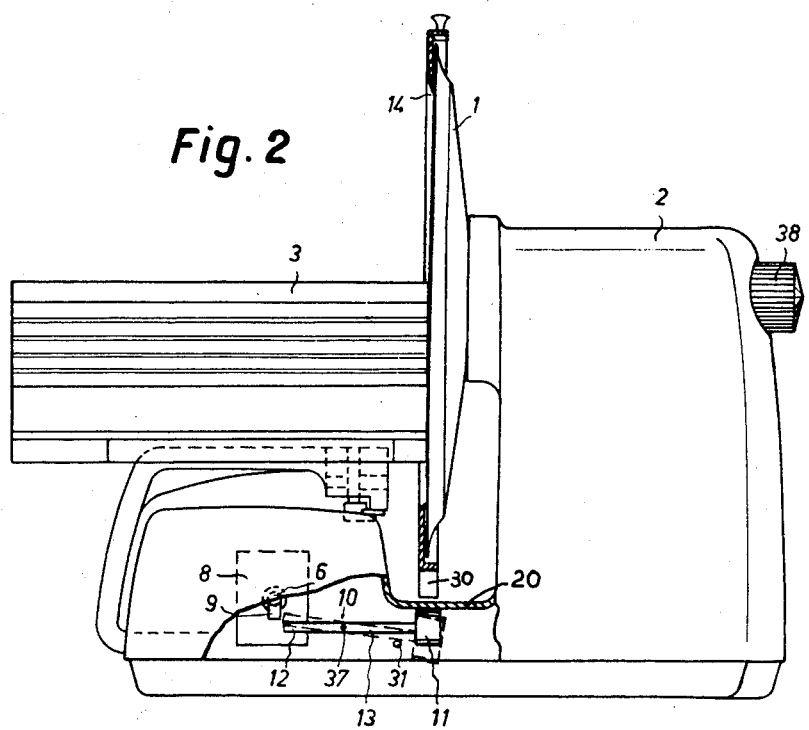

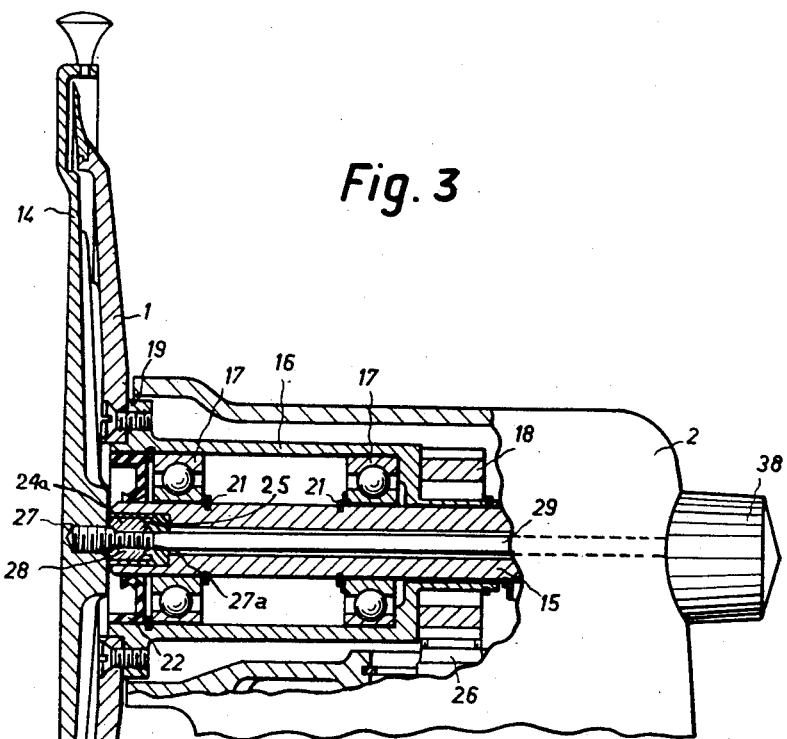
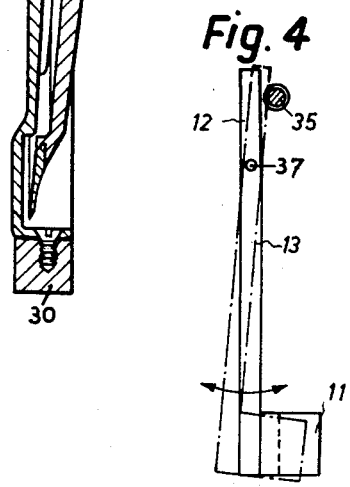
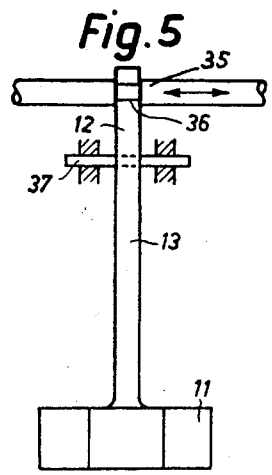

United States Patent Office 3,159,196
Patented Dec. 1, 1964

3,159,196
PROTECTIVE DEVICE FOR CUTTING MACHINES
WITH CUTTING DISC
Walter Engi, Zurich, Switzerland, assignor to
Adolf Ditting, Zurich, Switzerland
Filed Apr. 27, 1962, Ser. No. 190,703
Claims priority, application Switzerland, May 2, 1961,
5,118/61
7 Claims. (Cl. 146—102)

The present invention relates to a protective device for a motor driven cutting machine for meat and cold cuts, which is provided with a circular knife and a detachable knife protective hood partially surrounding said disc knife, and which is also provided with a switch located in the circuit of the motor driving the knife.

Most heretofore customary electric cutting machines of the above mentioned type have a knife covering hood which is detachable from the knife and surrounds the knife over a portion of its circumference.

For purposes of cleaning the knife and the machine, the protective hood is removed. This involves the danger that the motor by accidentally contacting the motor switch, for instance with the clothing, is switched on whereby the circular knife is put into motion and may cause accidents.

In an effort to prevent the motor from being switched on when the protective hood is removed from the knife, various safety devices have been suggested. According to one of these safety devices, a mechanical feeler is provided which between the knife or cutter protective hood and the motor switch actuates a relatively complicated locking system comprising a plurality of levers. The cutter hood in its turn is provided with an extension which extends through an opening in the machine housing and there acts upon a spring loaded pin which in its turn actuates the blocking system. However, the said opening may be covered by a crust and thereby prevent the safety device from properly reacting.

Furthermore, the individual levers of the lever system have to be made with high precision which fact greatly increases the costs of this device. Furthermore, there exists the possibility that during the cleaning of the machine, liquid passes into the interior of the housing through the feeler opening.

It is, therefore, an object of the present invention to provide a protective device which will overcome the above mentioned drawbacks.

It is another object of this invention to provide a protective device as set forth in the preceding paragraph which, while being simple in construction, will be reliable and effective.

These and other objects and advantages of the invention will appear more clearly from the following specification in connection with the accompanying drawings, in which:

FIG. 1 illustrates a side view of a cutting machine according to the invention with a vertical knife and partially broken housing wall.

FIG. 2 illustrates partially in section a view of the machine shown in FIG. 1, as seen in the direction of the arrow A.

FIG. 3 shows in section the journalling of the knife and the connection of the protective hood.

FIGS. 4 and 5 diagrammatically illustrate a second embodiment of a safety device according to the invention, said safety device being shown from the side and from the top respectively.

General Arrangement

The safety or protective device according to the present invention is characterized primarily in that the knife or cutter protective hood is provided with magnetic material or consists of such magnetic material which cooperates with an adjustable part of magnetic material in the machine housing. The said part is connected with a locking member controlling the motor switch or cooperates with a switch in the circuit of the motor. The arrangement is such that when the cutter hood is removed, it is impossible to switch on the motor.

In addition to being rather inexpensive while highly fast and effective in operation, the safety device according to the invention also has the advantage that it can be mounted on any existing machines without any material costs.

Structural Arrangement

Referring now to the drawings in detail and FIGS. 1 and 2 thereof in particular, the cutting machine with vertically arranged cutting disc or knife 1 has a housing 2 of an anti-magnetic material, preferably of aluminum or an aluminum alloy. The cutting machine is furthermore equipped with a table 3 adapted to be moved back and forth, and has an abutment plate 4 which is adjustable in a plane transverse to the plane of the cutting disc for adjusting the thickness of the slices to be cut. The abutment plate 4 is adjustable by a rotatable knob 5 which supports a shaft 6 in the interior thereof, said shaft 6 being adapted to actuate a motor switch 8 through a rotatable knob 7. Mounted on shaft 6, approximately within the range of the cutting disc 1 is a cam or pawl 9 cooperating with one arm 12 of a two-arm lever 10 adapted to tilt about a substantially horizontal pin 37 in housing 2. The second arm 13 of lever 10 is provided with magnetic material which is arranged in housing 2 approximately in the plane of the cutting disc below the axis of the latter. The term "magnetic material" is intended to comprise material which is adapted to cooperate magnetically with another material, i.e. which other material may be a magnet or material attracted thereby. According to FIG. 2, the magnet material is formed by a permanent magnet 11 which is connected to said lever arm 13. However, if desired, also an electromagnet or a body of soft iron may take the place of said permanent magnet 11. The connection of the protective hood 14, which preferably consists of aluminum or an aluminum alloy, will be evident from FIG. 3. A horizontal tube 15 connected to housing 2 has, by means of ball bearings 17, rotatably mounted thereon a sleeve 16 which is rigidly connected to a worm wheel 18. Sleeve 16 has a collar 19 extending beyond the sleeve wall, and it is to this collar or flange that the knife 1 has been screwed. Resilient spring rings 21 prevent sleeve 16 from being axially displaced on tube 15 and thereby also prevent a relative movement of cutter disc 1 with regard to housing 2. A rubber or leather gasket or sleeve 22 prevents soil and grease from entering sleeve 16 and ball bearings 17 from the outside.

Cutter disc or knife 1 is driven by a vertically arranged electric motor (not illustrated) having a shaft 26 to which is keyed a worm meshing with a worm wheel 18 which in its turn rotates sleeve 16 about tube 15.

A bolt 27 is centrically screwed into the cutter hood 14 and is provided with a square head 24a and an axial threaded bore 28. The end face of head 27a extends into an opening 25 at the end of tube 15 and is held fast by a screw 29, said head being adapted selectively to be tightened or loosened by handle 38. Protective hood 14 resting against the end face of the tube may, in view of the bolt head 27a, be assembled only in one certain position.

To the lowermost portion of the protective hood 14 is likewise connected a member of magnetic material, preferably a metallic body 30 of soft iron, which affects the location of magnet 11 arranged in housing 2. The magnet 11 is attracted by the metallic body 30 through the housing wall 20 and tilts arm 10 until the magnet contacts housing wall 20, and the lever arm 20 is outside the circular path of the extension 9. In this level position which is shown in full lines in FIG. 2, shaft 6 is adapted to be turned so that motor switch 8 can be turned on.

When removing the cutter protective hood 14, which removal is effected when the cutter disc is at a standstill, the mutual attractive force between the magnetic materials is interrupted and lever arm 13, due to the weight of magnet 11, drops downwardly until it hits the abutment 31. In this connection, arm 12 tilts upwardly into the circular path of the extension 9 as indicated in FIG. 2 in dash lines. In this position, shaft 6 cannot be turned because extension or tongue 9 engages lever 12. The switch 8 is thus blocked, and the motor can after removal of the cutter hood 14 not be turned on.

FIGS. 4 and 5 diagrammatically illustrate a further embodiment of the invention according to which the motor instead of being operable by a rotative movement is operable by an axial movement, in other words by a pressure switch through shaft 35. This shaft has a groove or reduced section 36 adapted to be engaged by lever arm 12 as soon as it is tilted into its blocking position indicated in FIG. 4 by dot-dash lines. Also in this instance the turning on of the motor will be impossible when the protective hood 14 is removed, at which time lever 12, 13 swings into the dot-dash line position of FIG. 4 in which lever arm 12 engages the reduced section 36 of shaft 35 and locks the same against axial movement.

It will be understood that with this arrangement, when the protective hood is properly mounted on the machine, the magnet 11 is attracted by magnet 30 so that lever 12, 13 occupies its vertical position illustrated in FIG. 4 in solid lines whereby shaft 35 is disengaged by said lever and free for selectively actuating the motor switch.

According to a further modification, a microswitch could be arranged below the magnet 11 so that the latter will interrupt the current supply to the motor when the magnet drops downwardly.

It is, of course, to be understood that the present invention is, by no means, limited to the particular constructions shown in the drawings but also comprises any modifications within the scope of the appended claims. Thus, the invention is also applicable to cutting machines with cutting knives in inclined or horizontal positions. Furthermore, the entire protective hood 14 could be made of magnetic material or such magnetic material could as part thereof be inserted into the protective hood.

What I claim is:

1. A cutting machine, especially for meat and cold cuts, which comprises: a housing, a rotatable cutting member in the housing having a peripheral cutting edge, an electric motor in the housing drivingly connected to said cutting member for rotating the same, a protective detachable hood normally mounted on the housing of said cutting machine and partially surrounding the cutting edge of said cutting member, said hood comprising magnetizable material, control means in the housing including magnetizable material for cooperation with the magnetizable material of said hood, said housing including an imperforate wall of nonmagnetic material between said hood and said control means, said control means being movable into a first position in which said magnetizable material of said hood and the magnetizable material of said control means magnetically interact so as to exert an attractive force upon each other, said control means also being movable into a second position in which said magnetic interaction is interrupted, said hood when mounted on the housing of the cutter positioning said magnetizable means for interaction to cause said control means to occupy said first position when said hood is mounted on said machine and to occupy said second position when said hood is detached from said machine, and means responsive to the movement of said control means into said second position for preventing operation of said motor.

2. A cutting machine, especially for meat and cold cuts, which comprises: a rotatable cutting member having a peripheral cutting edge, an electric motor drivingly connected to said cutting member for rotating the same, a protective detachable hood normally mounted on said cutting machine and partially surrounding the cutting edge of said cutting member, said hood comprising magnetizable material, switch means for controlling the operation of said motor, control means including magnetizable material for cooperation with the magnetizable material of said hood, one of said magnetizable materials being magnetic, said control means being movable into a first position in which said magnetizable material of said hood and the magnetizable material of said control means magnetically interact so as to exert an attractive force upon each other in response to mounting of said hood on the machine, said control means also being movable into a second position when said magnetic interaction is interrupted by removal of the hood from the machine, said control means in said second position being operable to block said switch means to thereby prevent actuation of the latter for starting said motor, said machine including an imperforate wall disposed between said hood and said control means.

3. A cutting machine, especially for meat and cold cuts, which comprises: a rotatable cutting member having a peripheral cutting edge, an electric motor drivingly connected to said cutting member for rotating the same, a protective detachable hood normally mounted on said cutting machine and partially surrounding the cutting edge of said cutting member, said hood comprising magnetizable material, control means including magnetizable material for cooperation with the magnetizable material of said hood, said control means being movable into a first position in which said magnetizable material of said hood and the magnetizable material of said control means magnetically interact so as to exert an attractive force upon each other in response to mounting the hood on the machine, said control means also being movable into a second position when said magnetic interaction is interrupted by removal of the hood from the machine, whereby said control means occupies said first position when said hood is mounted on said machine and occupies said second position when said hood is detached from said machine, said machine including an imperforate wall between said hood and said control means, means responsive to the movement of said control means into said second position for preventing operation of said motor, and microswitch means arranged adjacent said control means and operable in response to said control means moving into said second position to interrupt the energizing circuit for said motor to thereby prevent the starting of said motor while said protective hood is removed from said machine.

4. A cutting machine, especially for meat and cold cuts, which comprises: a rotatable cutting member having a peripheral cutting edge, an electric motor drivingly connected to said cutting member for rotating the same, a protective detachable hood normally mounted on said cutting machine and partially surrounding the cutting edge of said cutting member, said hood when mounted on said cutting machine having its lowermost portion provided with magnetic material, control means including a magnet for magnetic cooperation with said magnetic material of said hood, said control means being movable into a first position in which said magnetic material of said hood and said magnet of said control means interact magnetically so as to exert an attractive force upon each other, said control means also being movable into a second position in which said magnetic interaction is interrupted, said control means occupying said first position when said hood is mounted on said machine and occupying said second position when said hood is detachable from said machine, means responsive to the movement of said control means into said second position for preventing operation of said motor, said machine including an imperforate wall between said magnetic material and said magnet, said wall being non-magnetic and being abutted by said magnet when said control means is in said first position.

5. A cutting machine, especially for meat and cold cuts, which comprises: a rotatable cutting member having a peripheral cutting edge, an electric motor drivingly connected to said cutting member for rotating the same, control shaft means operable to control the energization of said motor, said control shaft means being provided with recess means, a protective detachable hood normally mounted on said cutting machine and partially surrounding the cutting edge of said cutting member, said hood comprising magnetizable material, pivotally supported two arm lever means having one arm provided with magnetizable material for cooperation and magnetic interaction with the magnetizable material of said hood to move said lever in response to mounting the hood on the machine and having the other arm movable into a blocking position for blocking actuation of said control shaft in response to interruption of said magnetic interaction by removal of said hood from said machine, said lever means moving said other arm to an ineffective position in response to the magnetic interaction between the magnetizable material of said lever means and the magnetizable material of said hood as brought about by mounting the hood on the machine to permit actuation of said control shaft means, said machine having an imperforate wall between said hood and said lever.

6. A cutting machine according to claim 5, in which said control shaft means is rotatable and has a radially protruding extension, and in which said other arm is operable in response to the movement of said two arm lever into its blocking position to engage and block said extension, thereby blocking rotation of said shaft means for energizing said motor.

7. A cutting machine, especially for meat and cold cuts, which comprises: a rotatable cutting member having a peripheral cutting edge, an electric motor drivingly connected to said cutting member for rotating the same, axially movable control shaft means for controlling the energization of said motor, said control shaft means being provided with lateral recess means, a protective detachable hood normally mounted on said cutting machine and partially surrounding the cutting edge of said cutting member, said machine having an imperforate wall located directly beneath the hood when the latter is mounted on the machine, said hood comprising magnetizable material on the bottom, pivotally supported lever means under said wall provided with magnetizable material near the end located for cooperation and magnetic interaction with the magnetizable material of said hood when the hood is mounted on the machine, one of said magnetizable materials being magnetic, said lever means being movable into a first position when the hood is on the machine and said magnetizable material of said hood and the magnetizable material of said control means magnetically interact and to exert an attractive force upon each other, said lever means also being movable into a second position when said magnetic interaction is interrupted by removing the hood from the machine and in which second position said lever means engages said recess means thereby blocking axial movement of said control means, said lever means automatically moving into said second position in response to a withdrawal of said hood from said machine.

References Cited by the Examiner

UNITED STATES PATENTS

| | | | |
|---|---|---|---|
| 1,724,598 | 8/29 | Johnston | 146—67 |
| 2,558,766 | 7/57 | Lundell | 146—102.7 |
| 2,802,235 | 8/57 | Brown | 192—135 |
| 2,830,686 | 4/58 | Blume et al. | 192—129 X |
| 2,924,682 | 2/60 | Winterburn | 200—87.3 |
| 3,049,208 | 8/62 | Parkes | 192—135 |

J. SPENCER OVERHOLSER, *Primary Examiner*.

LOUIS J. CAPOZI, *Examiner*.